Feb. 15, 1966  K. P. LINDSEY  3,235,652
ELECTRIC LINE CROSS-ARM WITH WIRE STRINGING AND CLAMPING MEANS
Filed March 10, 1964  3 Sheets-Sheet 1

INVENTOR.
KENNETH P. LINDSEY,
BY
McMorrow, Berman & Davidson
ATTORNEYS.

Feb. 15, 1966 K. P. LINDSEY 3,235,652
ELECTRIC LINE CROSS-ARM WITH WIRE STRINGING AND CLAMPING MEANS
Filed March 10, 1964 3 Sheets-Sheet 2

INVENTOR.
KENNETH P. LINDSEY,
BY
McMorrow, Berman & Davidson
ATTORNEYS.

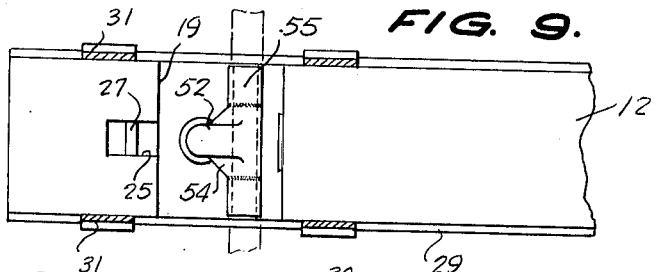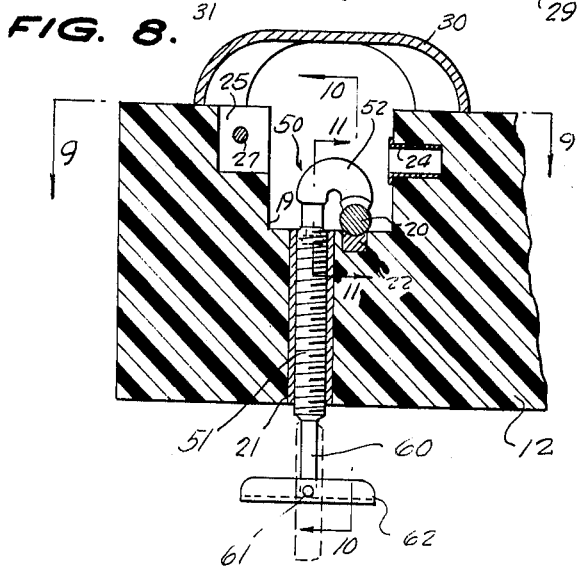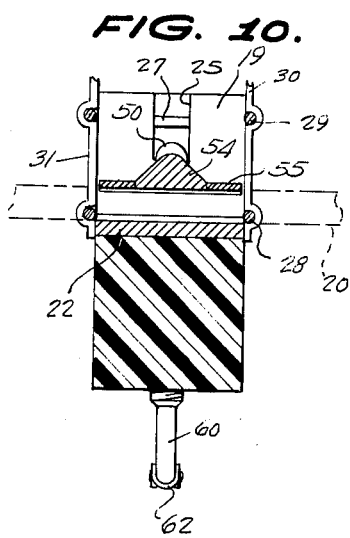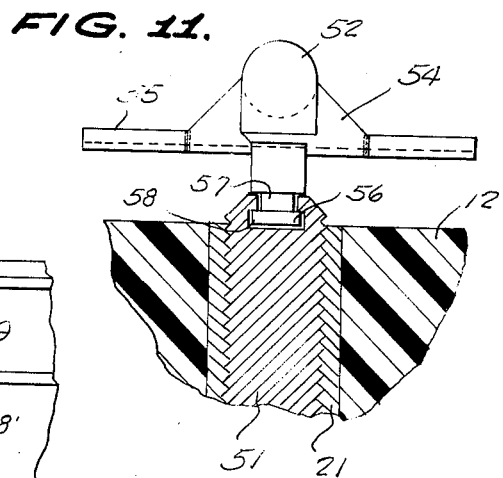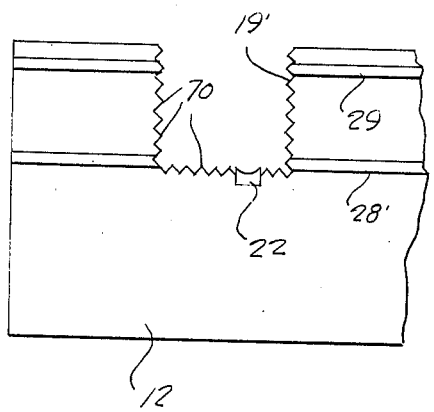

United States Patent Office 3,235,652
Patented Feb. 15, 1966

3,235,652
ELECTRIC LINE CROSS-ARM WITH WIRE
STRINGING AND CLAMPING MEANS
Kenneth P. Lindsey, Durango, Colo.
(Box 68, Hesperus, Colo.)
Filed Mar. 10, 1964, Ser. No. 350,790
8 Claims. (Cl. 174—45)

This invention relates to wire supporting members, and more particularly to cross-arm assemblies for supporting electrical conductors on poles.

A main object of the invention is to provide a novel and improved cross-arm assembly for supporting electric wires in elevated positions, for example, for supporting the wires on poles, the cross-arm assembly being of relatively simple construction, being provided with means for facilitating the stringing of the wires thereon, and being further provided with means for subsequently clamping the wires thereto in taut condition.

A further object of the invention is to provide an improved wire-supporting cross-arm assembly which involves relatively inexpensive components, which employs relatively few metal parts, whereby to minimize radio interference noise, and which protectively supports the wires thereon with the clamped portions of the wires shielded against adverse weather conditions, whereby to minimize corrosion or other deterioration of the clamped portions of the wires.

A still further object of the invention is to provide an improved cross-arm assembly for supporting electric conductors, the assembly employing relatively inexpensive components, requiring no special tools for installation, being relatively light in weight so that it is easy to handle, and providing a substantial saving in labor and time in installing electric wires thereon.

Further objects and advantages of the invention will become apparent from the following description and claims, and from the accompanying drawings, wherein:

FIGURE 8 is a fragmentary vertical cross sectional view generally similar to but to a smaller scale than FIGURE 4, but showing the installation of a permanent clamping member in place of the wire guide member employed in stringing the wire.

FIGURE 9 is a horizontal cross sectional view taken substantially on the line 9—9 of FIGURE 8.

FIGURE 10 is a transverse vertical cross sectional view taken substantially on the line 10—10 of FIGURE 8.

FIGURE 11 is an enlarged fragmentary vertical cross sectional view taken substantially on the line 11—11 of FIGURE 8.

FIGURE 12 is a fragmentary side elevational view of an end portion of a modified main cross-arm body according to the present invention which may be employed in place of the cross-arm body shown in FIGURES 1 to 11.

Figure 1:
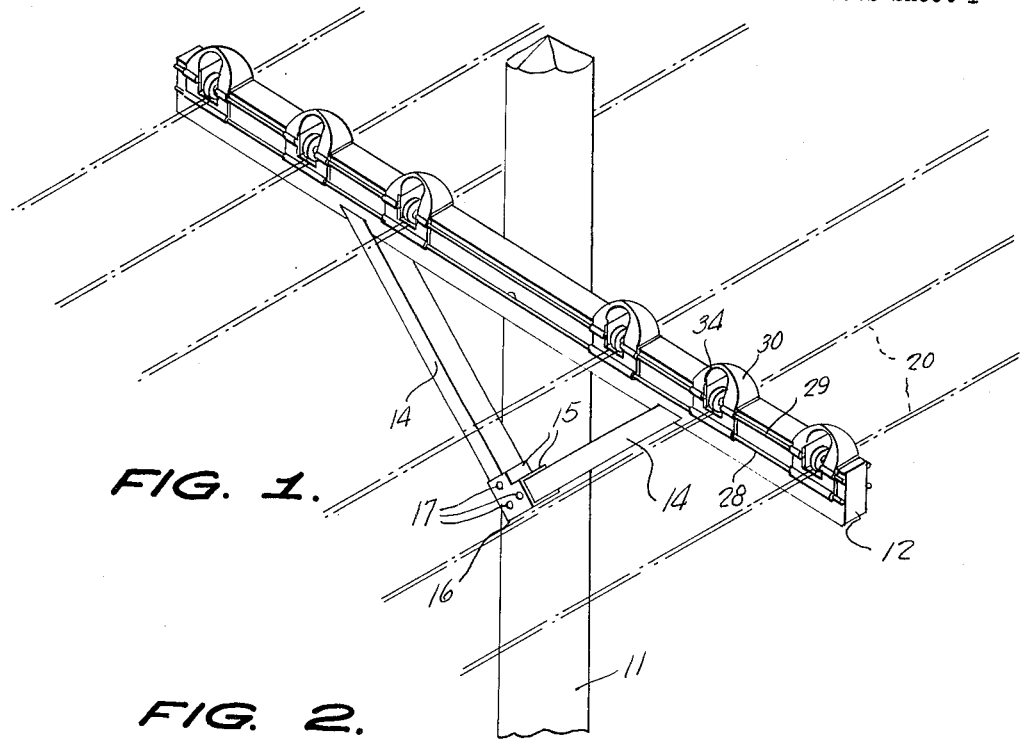
FIGURE 1 is a perspective view showing an improved wire-supporting cross-arm assembly secured to the top portion of a supporting pole and arranged for stringing a plurality of electric wires thereon.
Figure 2:
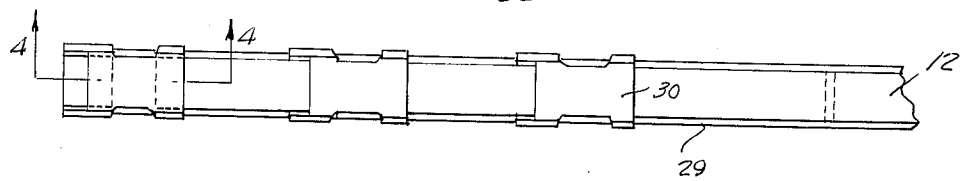
FIGURE 2 is a fragmentary enlarged top plan view of the cross-arm assembly illustrated in FIGURE 1.
Figure 3:
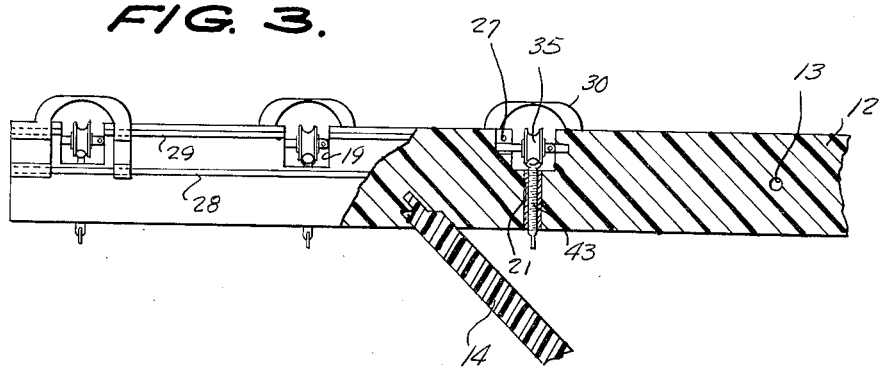
FIGURE 3 is a side elevational view, partly in longitudinal vertical cross section, of the structure of FIGURE 2.

Referring to the drawings, 11 designates a vertical supporting pole to the top end of which is secured a transversely extending main cross-arm body 12 constructed in accordance with the present invention. The cross-arm body 12 comprises an elongated bar member of generally rectangular cross sectional shape and which is preferably of molded plastic construction, being centrally apertured at 13 to receive a fastening member for securing same to the supporting pole 11. Secured to the main body 12 are a pair of downwardly convergent strut bars 14, 14, also preferably of molded plastic construction, whose lower ends are received in the respective rectangular sleeve portions 15, 15 of an elbow bracket 16, the lower end portions of the strut bars 14 being secured in said sleeve portions 15 and the bracket member 16 being secured to the pole 11, as by suitable fastening members 17, which may comprise nails, screws, or the like.

The elongated main cross-arm body 12 is formed with a plurality of upwardly facing rectangular notches 19 adapted to receive the wires 20 to be supported. Molded in the body 12 and terminating in the bottom wall of each notch 19 is a vertical sleeve 21 which is internally threaded, and also molded in the bottom of each notch 19 is a transversely extending bearing bar 22 having a concave top face 23.

Molded in one side wall of each notch 19 is a horizontal sleeve-like metal socket 24, the opposing wall of each notch 19 being formed with a rectangular recess 25 opening at the top surface of the cross bar, the cross bar having transversely aligned bores 26 to receive a retaining pin 27 for a purpose presently to be described.

The members 21 and 22 are of suitable durable metal, for example, may be of stainless steel or other metal resistant to severe weather conditions. The sleeve 24 is likewise of weather-resistant metal.

The longitudinal side walls of the main body 12 are formed with guide ribs 28 and 29, the lower guide ribs 28 being continuous and the upper guide ribs 29 being interrupted at the notches 19. The pairs of vertically spaced guide ribs 29 and 28 on the respective longitudinal vertical faces of the cross bar body 12 may be formed thereon in any suitable manner, for example, may be integrally formed thereon by extrusion of the bar 12, or may be formed by rigidly securing rod-like bodies to said longitudinal side faces of member 12 in any suitable manner.

Mounted on the top portion of the cross bar body 12 are a plurality of protective housing members 30, which may comprise hood-shaped bodies of plastic material or other suitable material formed with depending plate-like sides 31, 31 adapted to closely engage against the longitudinal side walls of the body 12 and formed with channels 32 to slidably receive the ribs 29 and 28. The hood-like housing members 30 may then be positioned over the respective notches 19 so that the top wall portions 33 of said housings protectively overlie a substantial portion of the interiors of the notches. The hood-like members 30 are provided with side apertures 34 registrable with the respective opposite ends of the adjacent notches 19.

Figure 4:
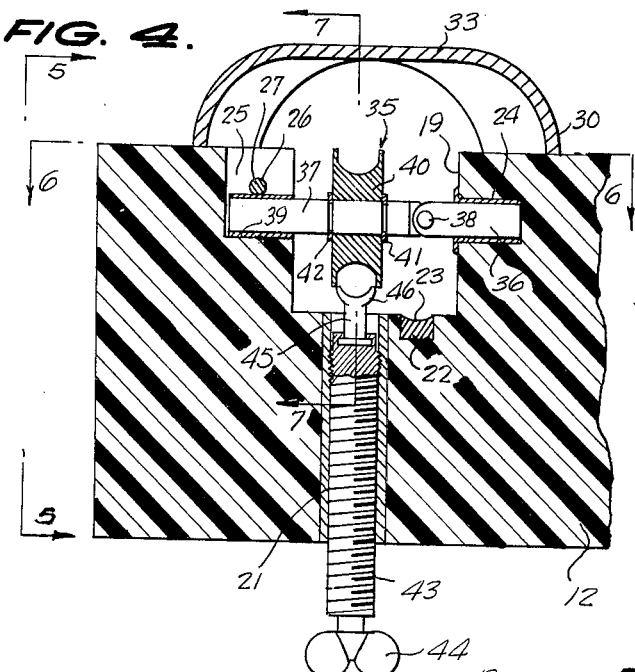
FIGURE 4 is an enlarged fragmentary cross sectional view taken substantially on the line 4—4 of FIGURE 2.
Figure 5:
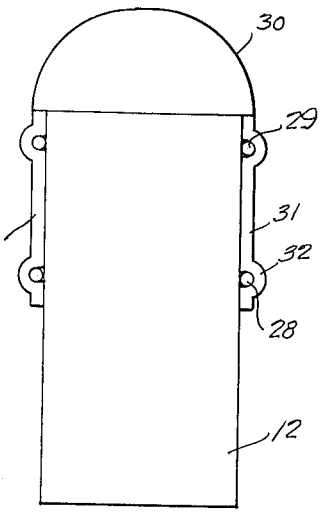
FIGURE 5 is an end elevational view taken substantially on the line 5—5 of FIGURE 4.
Figure 6:
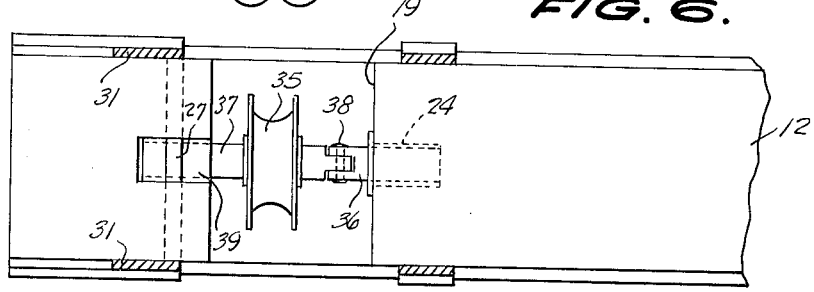
FIGURE 6 is a horizontal cross sectional view taken substantially on the line 6—6 of FIGURE 4.
Figure 7:
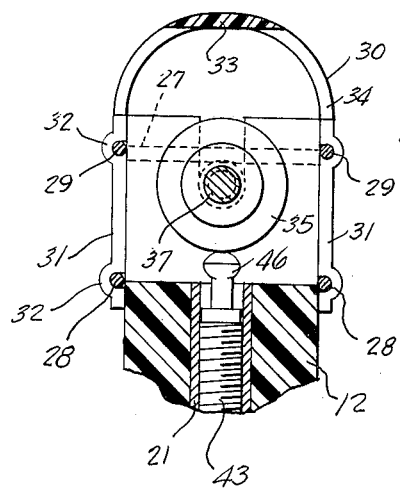
FIGURE 7 is a fragmentary transverse vertical cross sectional view taken substantially on the line 7—7 of FIGURE 4.

In the preliminary installation of the wires 20 through the notches 19, guide assemblies designated generally at 35 are employed, each guide assembly comprising a shank portion 36 which is removably engageable in a sleeve 24, and shaft portions 37 pivotally connected at 38 to the shank portions 36 and having cover sleeves 39 on their free end portions. The free end portions of the shaft elements 37, with their cover sleeves 39 are supported on the bottom walls of the recesses 25 in the manner illustrated in FIGURE 4, and are retained in horizontal positions by the transversely extending cross pins 27 engaged through the pairs of registering transverse bores 26 provided for each recess 25. As shown in FIGURE 6, the transverse retaining pin 27 overlies the cover sleeves 39 and restrains the associated shaft member 37 against upward movement. The pins 27 are held in position by the engagement of their end portions with the inside surfaces of the side wall elements 31, 31 of the associated protective housing members 30. The pins 27 may be removed by shifting the associated housings 30 longitudinally to allow access to the outer ends of the bores 26. The pins 27 are inserted in a similar manner.

Journaled on each shaft member 37 is a peripherally grooved guide roller 40, held in a predetermined position on its shaft by respective retaining collars 41 and 42 positioned in annular grooves provided therefor in the shaft 37 on opposite sides of the guide roller 40. The guide roller 40 is located so as to be in vertical alignment with the internally threaded sleeve member 21 of the associated notch 19. Threadedly engaged in the sleeve member 21 is a vertical bolt member 43 integrally formed at its bottom end with a winged head 44. Rotatably secured to the top end of the bolt member 43 is an upstanding post element 45 formed at its top end with an upwardly concave saddle 46 shaped to underlie an electrical conductor 20 and to cooperate with the grooved periphery of the pulley 40 to guide the conductor longitudinally as it is being strung through the notch 19. The conductor may be forced upwardly tightly against the roller 40 by turning the winged head 44 in a direction to elevate bolt 43 in sleeve 41, so that all looseness and lost motion is eliminated and so that the conductor is held tightly against the peripheral groove in the roller 40. By exerting sufficient force on the conductor, it may be clamped temporarily against the roller 40 while another portion of the conductor is being anchored to maintain the conductor in the desired condition of tension.

After the wire has been anchored at some other location so that it is under proper tension, the bolt member 43 is loosened and is unscrewed from the sleeve 21. The retaining pin 27 is then removed in the manner above described, namely, by first shifting the associated housing 30 longitudinally to expose the ends of the bores 26, after which the guide assembly 35 is removed, namely, by first elevating shaft 37 above the top plane of the cross bar and then pulling the shank element 36 out of its sleeve-like socket 24. The guide assembly 35 is replaced by a permanent clamping assembly, designated generally at 50 in FIGURE 8, the clamping assembly comprising an externally threaded main shank portion 51 which is threadedly engageable inside the sleeve 21 and an inverted U-shaped, thickened top arm 52 formed in its outer end with a downwardly flaring, transversely extending brace portion 54 terminating in a downwardly concave transverse clamping channel 55. The top arm 52 is of such shape and size that the clamping channel 55 may be positioned directly over and parallel with the bearing insert 22, whereby the conductor 20 may be received therebetween and may be clamped in fixed position in the notch 19 by tightening the threaded shank member 51, namely, by moving it downwardly. To permit the rotation of the shank portion 51 relative to the inverted U-shaped arm portion 52, a rotatable joint is provided between the lower end of the inner arm of member 52 and the top end of the shank portion 51. Thus, as shown in FIGURE 11, the lower end portion of the inner arm of member 52 is formed with a rotatable head element 56 and with a neck portion 57, the head element 56 being received in a circularly shaped undercut socket or recess 58 formed in the top end of the bolt member 51. It is noted that the post member 45 previously employed in conjunction with the guide assembly 35 is rotatably connected to the top end of the bolt member 43 in a substantially similar manner.

As shown in FIGURE 8, the lower end portion of the bolt member 51 is reduced in diameter, as shown at 60, and pivoted to the bottom end of the reduced shank portion 60, at 61, is a channel-shaped gripping handle 62 which may be at times folded nestingly receiving the reduced portion 60, as shown in dotted view in FIGURE 8. When the channel-shaped handle element 62 is in the aforesaid folded vertical position, the bolt member 51 may be inserted from above through the sleeve 21 and may be moved downwardly sufficiently so that the threads on the bolt member 51 can engage the internal threads in the top portion of the sleeve 21. The bolt member 51 may then be rotated sufficiently to bring the portion 62 below the bottom plane of the cross bar body 12, after which the handle portion 62 may be rotated to a horizontal position and may be thereafter employed to rotate the bolt member 51. Continued rotation of the bolt member 51 causes the clamping arm 55 to descend sufficiently so that it can clampingly engage a conductor 20 positioned on the clamping insert 22 in the bottom wall of notch 19. The conductor 20 may thus be rigidly clamped in the notch 19 to hold it under the desired tension without further reliance on any external anchoring means.

FIGURE 12 illustrates a modified form of notch which may be employed in the cross arm body 12, the notch being designated generally at 19' and having its respective walls formed with serrations 70. The serrations 70 form channels facilitating run off of water from the notches 19', so as to prevent collection of water therein and subsequent freezing of the water.

It will be noted that the lower guide ribs 28 in the form of the invention illustrated in FIGURES 1 to 11 are located substantially at the same level as the bottom walls of the notches 19. Thus, the guide ribs 28 are continuous, in comparison to the guide ribs 29 which are interrupted. The lower guide ribs may be also interrupted, as shown in FIGURE 12, at 28', namely, may be located slightly above the bottom surface plane of the notches 19'. The function of the guide ribs 28' remains the same, namely, to cooperate with the channels 32 in the housing members 30 so as to properly position said housing members in protective overlying relationship to the notches 19'.

While certain specific embodiments of an improved electric wire supporting arm have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An electric wire supporting arm comprising an elongated bar member of rigid insulating material formed with at least one notch adapted to receive an electric wire substantially transverse to the arm, means in the notch threadedly engaging the bar member and being clampingly engageable with a wire received in the notch, and a stringing roller journaled in the notch opposite said means.

2. An electric wire supporting arm comprising an elongated bar member of rigid insulating material formed with at least one notch adapted to receive an electric wire substantially transverse to the arm, a vertical shank member threadedly engaged through the bar member adjacent the notch, clamping means connected to said shank member and extending into the notch, said clamping means being clampingly engageable with a wire received in the notch, and a stringing roller journaled in said notch in a position substantially overlying said clamping means.

3. An electric wire supporting arm comprising an elongated bar member of rigid insulating material formed with at least one notch adapted to receive an electric wire substantially transverse to the arm, an internally threaded vertical sleeve molded in the bar member and opening at the bottom wall of the notch, clamping means threadedly engageable in said sleeve and having a top portion located in the notch and being clampingly engageable with a wire received in the notch, and a stringing roller journalled in said notch in a position substantially overlying the top end of said sleeve.

4. An electric wire supporting arm comprising an elongated bar member of rigid insulating material formed with at least one notch adapted to receive an electric wire substantially transverse to the arm, an internally threaded vertical sleeve molded in the bar member and opening at the bottom wall of the notch, clamping means threadedly engageable in said sleeve and having a top portion located in the notch and being clampingly engageable with a wire received in the notch, a stringing roller journalled in the notch in a position substantially overlying the top end of said sleeve, and a protective housing member slidably engaged on the bar member and being movable to a position overlying and substantially covering the notch.

5. An electric wire supporting arm comprising an elongated bar member of rigid insulating material formed with at least one notch adapted to receive an electric wire substantially transverse to the arm, an internally threaded vertical sleeve molded in the bar member and opening at the bottom wall of the notch, clamping means threadedly engageable in said sleeve and having a top portion located in the notch and being clampingly engageable with a wire received in the notch, and a stringing roller journalled in the notch in a position substantially overlying the top end of said vertical sleeve.

6. An electric wire supporting arm comprising an elongated bar member of rigid insulating material formed with at least one notch adapted to receive an electric wire substantially transverse to the arm, an internally threaded vertical sleeve molded in the bar member and opening at the bottom wall of the notch, clamping means threadedly engageable in said sleeve and having a top portion located in the notch and being clampingly engageble with a wire received in the notch, a horizontal bearing socket in one side wall of the notch, the opposite side wall of the notch being formed with a bearing recess, shaft means supportingly received in said socket and said bearing recess, removable transverse pin means extending through said opposite side wall over the shaft means and holding the shaft means in the bearing recess, and a stringing roller on said shaft means in a position substantially overlying the top end of said vertical sleeve.

7. An electric wire supporting arm comprising an elongated bar member of rigid insulating material formed with at least one notch adapted to receive an electric wire substantially transverse to the arm, an internally threaded vertical sleeve molded in the bar member and opening at the bottom wall of the notch, clamping means threadedly engageable in said sleeve and having a top portion located in the notch and being clampingly engageable with a wire received in the notch, a horizontal bearing socket in one side wall of the notch, the opposite side wall of the notch being formed with a bearing recess, shaft means having a first end portion supportingly received in said socket and having a second portion hinged to the first end portion and received in said bearing recess, removable transverse pin means extending through said opposite side wall over said second portion and holding same in the bearing recess, and a stringing roller on said second portion in a position substantially overlying the top end of said vertical sleeve.

8. An electric wire supporting arm comprising an elongated bar member of rigid insulating material formed with at least one notch adapted to receive an electric wire substantially transverse to the arm, an internally threaded vertical sleeve molded in the bar member and opening at the bottom wall of the notch, clamping means threadedly engageable in said sleeve and having a top portion located in the notch and being clampingly engageable with a wire received in the notch, a horizontal bearing socket in one side wall of the notch, the opposite side wall of the notch being formed with a bearing recess, shaft means having a first end portion supportingly received in said socket and having a second portion hinged to the first end portion and received in said bearing recess, removable transverse pin means extending through said opposite side wall over said second portion and holding same in the bearing recess, a stringing roller on said second portion in a position substantially overlying the top end of said vertical sleeve, and a protective housing member slidably engaged on the bar member and being movable to a position overlying and substantially covering the notch and having means preventing endwise withdrawal of said transverse pin means.

References Cited by the Examiner

UNITED STATES PATENTS

| | | | |
|---|---|---|---|
| 554,723 | 2/1896 | Peloubet | 174—148 |
| 945,350 | 1/1910 | Tinsley | 174—45 X |
| 1,713,426 | 5/1929 | Drake et al. | 174—168 X |
| 2,263,319 | 11/1941 | Treanor | 174—139 |

FOREIGN PATENTS

| | | |
|---|---|---|
| 13,044 | 1907 | Great Britain. |
| 180,780 | 6/1922 | Great Britain. |
| 38,967 | 8/1907 | Switzerland. |

ROBERT K. SCHAEFER, *Primary Examiner.*

LARAMIE E. ASKIN, *Assistant Examiner.*